United States Patent [19]

Walls

[11] Patent Number: 5,530,377
[45] Date of Patent: Jun. 25, 1996

[54] METHOD AND APPARATUS FOR ACTIVE TERMINATION OF A LINE DRIVER/RECEIVER

[75] Inventor: Lloyd A. Walls, Austin, Tex.

[73] Assignee: International Business Machines Corporation, Armonk, N.Y.

[21] Appl. No.: 498,492

[22] Filed: Jul. 5, 1995

[51] Int. Cl.⁶ .................... H03K 17/16; H03K 19/0175
[52] U.S. Cl. .................................................. 326/30; 326/86
[58] Field of Search .................... 326/30, 83, 86

[56] References Cited

U.S. PATENT DOCUMENTS

| | | | |
|---|---|---|---|
| 3,832,575 | 8/1974 | Dasgupta et al. | 326/30 |
| 5,097,148 | 3/1992 | Gabara | 326/30 |
| 5,164,663 | 11/1992 | Alcorn | 326/30 |
| 5,206,544 | 4/1993 | Chen et al. | 326/83 |
| 5,227,677 | 7/1993 | Furman | 326/30 |
| 5,282,173 | 1/1994 | Miyaji et al. | 365/230.03 |
| 5,296,756 | 3/1994 | Patel et al. | 326/30 |
| 5,311,081 | 5/1994 | Donaldson et al. | 326/30 |
| 5,347,177 | 9/1994 | Lipp | 326/30 |
| 5,463,326 | 10/1995 | Raje | 326/30 |

OTHER PUBLICATIONS

Author unknown, IBM Disclosure Stmt. #IBMCGK 7995 (3 pages).
T. Ludwig et al., IBM Tech. Disc. Bul. vol. 30, No. 7, Dec. 1987, pp. 393–395.
"Active Terminators for CMOS Drivers", IBM Technical Disclosure Bulletin, vol. 32, No. 4A, Sep. 1989.

*Primary Examiner*—Edward P. Westin
*Assistant Examiner*—Richard Roseen
*Attorney, Agent, or Firm*—Mark E. McBurney; Jenkens & Gilchrist

[57] ABSTRACT

A method and apparatus for providing active termination of a transmission line is accomplished by providing a pair of complementary transistors operably coupled to the transmission line, wherein one of the transistors provides the active termination impedance when the transmission line is in a first state, and the other transistor provides the active termination when the transistor is in a second state. The complementary pair of transistors may be gated such that when it is desired to remove the active termination from the circuit, it can be done. The line driver/receiver reduces part count by commonly using circuitry in the active termination stage and the receiver stage.

12 Claims, 4 Drawing Sheets

1

METHOD AND APPARATUS FOR ACTIVE TERMINATION OF A LINE DRIVER/RECEIVER

TECHNICAL FIELD OF THE INVENTION

This invention relates generally to transmission line drivers and receivers and more particularly to an active termination of such transmission lines.

BACKGROUND OF THE INVENTION

Transmission lines and their effects are well known. As is known, an unterminated transmission line will have approximately twice the voltage at the unterminated end as it does at the transmitting end. To prevent this doubling of the voltage, transmission lines are commonly terminated with a passive termination device having an impedance that substantially matches that of the transmission line. For example, if the transmission line has an impedance of 50 ohms, the passive termination device will be a 50 ohm resistor.

Almost all types of circuits are susceptible to transmission line effects. For example, transmission line effects occur in the telecommunications transmissions over a wire line path, in computer networks over the Ethernet or other interconnecting means, and within the computer system itself. In each of these circuits, the transmission line is terminated with an impedance that substantially matches the impedance of the transmission line to prevent the doubling of the original signal.

In many applications, where power consumption is a critical issue, the use of a passive termination device, i.e., a resistor, consumes excessive power. To reduce the power consumption of termination devices, one prior art technique uses an active termination circuit. In an active termination scheme, the termination impedance is only activated at times of signal transmissions and/or during signal transitions (i.e., the signal changing from low to high or high to low). Thus, the power consumed by the active termination, which may be a transistor, is reduced in comparison to that of the passive, or resistive, termination element. While active termination circuits reduce power consumption in comparison to their passive equivalents, they introduce additional circuitry to the line driver/receiver device. In addition, active termination circuits cannot be disconnected from the receiver circuit for testing at burn-in or during normal operations. Because the active termination circuit cannot be disconnected, parallel receiver operation must take into account the impedance of each of the active termination circuits of each line driver/receiver. In such a configuration, the parallel combination of the receiver termination elements provides the overall transmission line termination impedance. Thus, the termination impedance has to be calculated to take into account each of the receiver circuits coupled to the transmission line. If a receiver is added or removed from the circuit, the termination impedance has to be adjusted accordingly or the circuit functions with an impedance mismatch causing the signals to be distorted.

Therefore, a need exists for a method and apparatus that provides an active termination circuit having a minimal part count and the ability to be disconnected from the line driver/receiver circuit.

DETAILED DESCRIPTION OF PREFERRED EMBODIMENTS OF THE INVENTION

Generally, the present invention provides a method and apparatus for providing active termination of a transmission line. This is accomplished by providing a pair of complementary transistors operably coupled to the transmission line, wherein one of the transistors provides the active termination impedance when the transmission line is in a first state, and the other transistor provides the active termination when the transistor is in a second state. The complementary pair of transistors may be gated such that when it is desired to remove the active termination from the circuit, it can be done. Alternatively, the complementary pair of transistors may be gated in parallel with the line driver circuit. The line driver/receiver reduces its part count by using a section of the active termination state in the receiver section. With such a method and apparatus, the present invention provides a reduced part count active termination circuit, wherein the active termination can be removed for testing and parallel receiver operation, and the active termination may be gated from parallel line driver operation.

Figure 1:
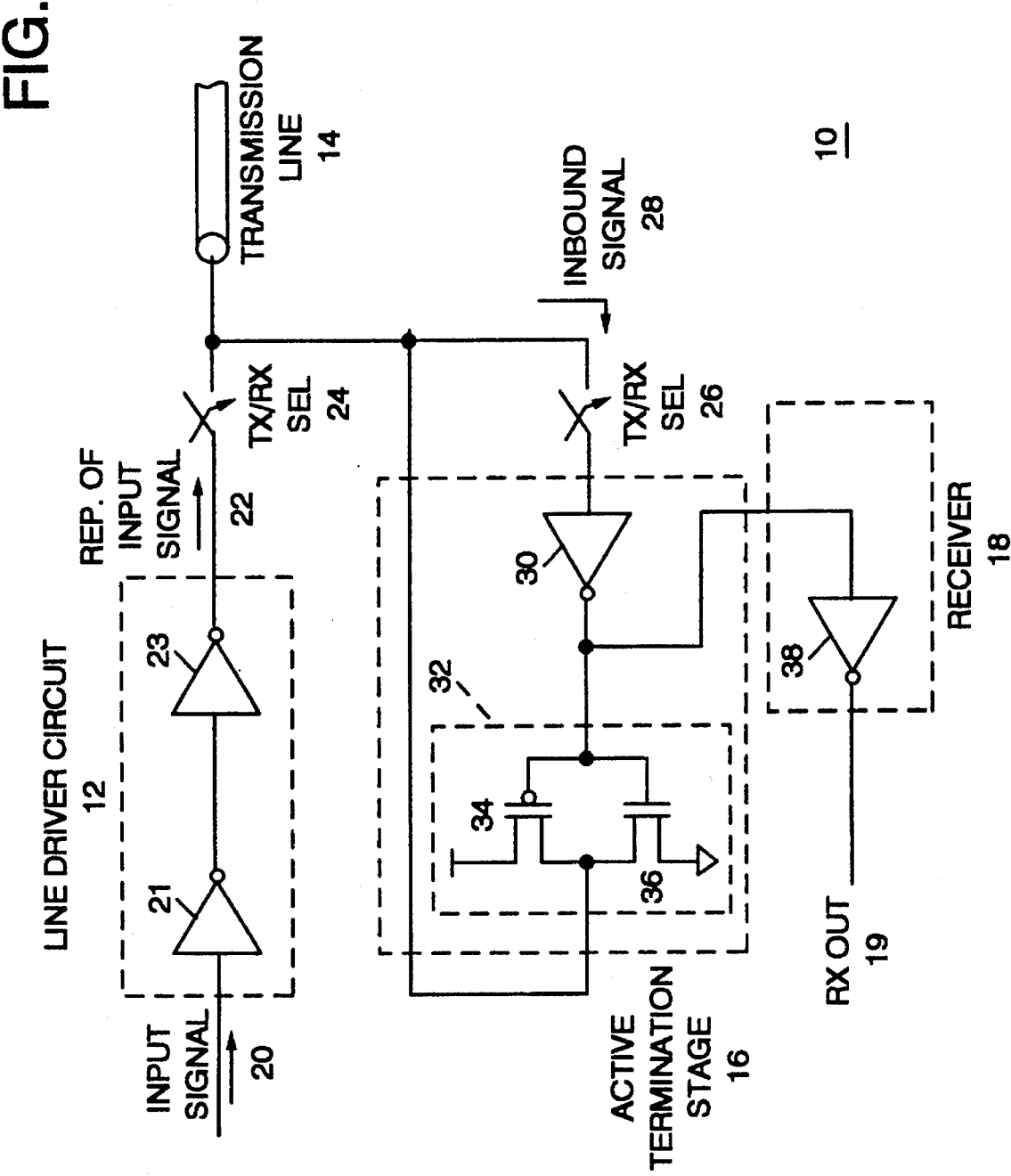
FIG. 1 illustrates a schematic block diagram of a line driver/receiver circuit in accordance with the present invention.

FIG. 1 illustrates a schematic block diagram of a line driver/receiver 10 which includes a line driver circuit 12, an active termination stage 16, and a receiver 18 coupled to a transmission line 14. The line driver circuit 12 receives an input signal 20 and inverts it in a first inverter 21 and then provides a subsequent inversion in a second inverter 23 to produce a representation of the input signal 22. Inverters 21 and 23 are designed using complementary transistor pairs to provide a high impedance input and a low impedance output. When the line driver/receiver 10 is in the transmit mode, transmit/receive (Tx/Rx) select switch 24 will be closed while Tx/Rx select switch 26 will be open. In this configuration, the active termination stage 16 and the receiver 18 are disconnected from the transmission line while the line driver circuit 12 remains connected to the transmission line.

When the line driver/receiver circuit 10 is in the receive mode, Tx/Rx selection switch 24 will be open while Tx/Rx selection switch 26 will be closed. In this configuration, an inbound signal 28 is received by the active termination stage via an inverter 30. The output of the inverter 30 is coupled to a complementary pair of transistors 32 and also to the receiver 18. The complementary pair of transistors 32 includes a P-channel field effect transistor (FET) 34 and an N-channel FET 36. The transistors are coupled to produce an inversion of the signals received. As configured, the inbound signal 28 is inverted by inverter 30 and inverter again by the complementary pair of transistors 32 such that at the output of the complementary pair of transistors 32 provides a representation of the inbound signal 28, i.e., the inbound signal is recaptured.

To provide the active termination, the N-channel FET 36 and the P-channel FET 34 are chosen to haw, an active impedance that substantially matches that of the transmission line. For example, if the transmission line has an impedance of 50 ohms, each of the transistors 34 and 36 will have an on-resistance of 50 ohms. To illustrate, when the inbound signal 28 is a logic "1", the P-channel FET 34 will be active to provide the active termination, while the N-channel FET 36 will be inactive. Conversely, when the inbound signal is a logic "0", the N-channel FET 36 will be active to provide the active termination. Note, that in this configuration, FETs 34 and 36 are only sinking current when the inbound signal is in transition.

The output of inverter 30, as mentioned, is also coupled to the receiver 18. As shown, the receiver 18 includes an inverter 38 which is coupled to the output of inverter 30. The inverter 38 inverts the inverted inbound signal to produce the received output 19. The inverters 30 and 38 are, each formed of a complementary pair of transistors, which may be P-channel FETs and N-channel FETs.

Figure 2:
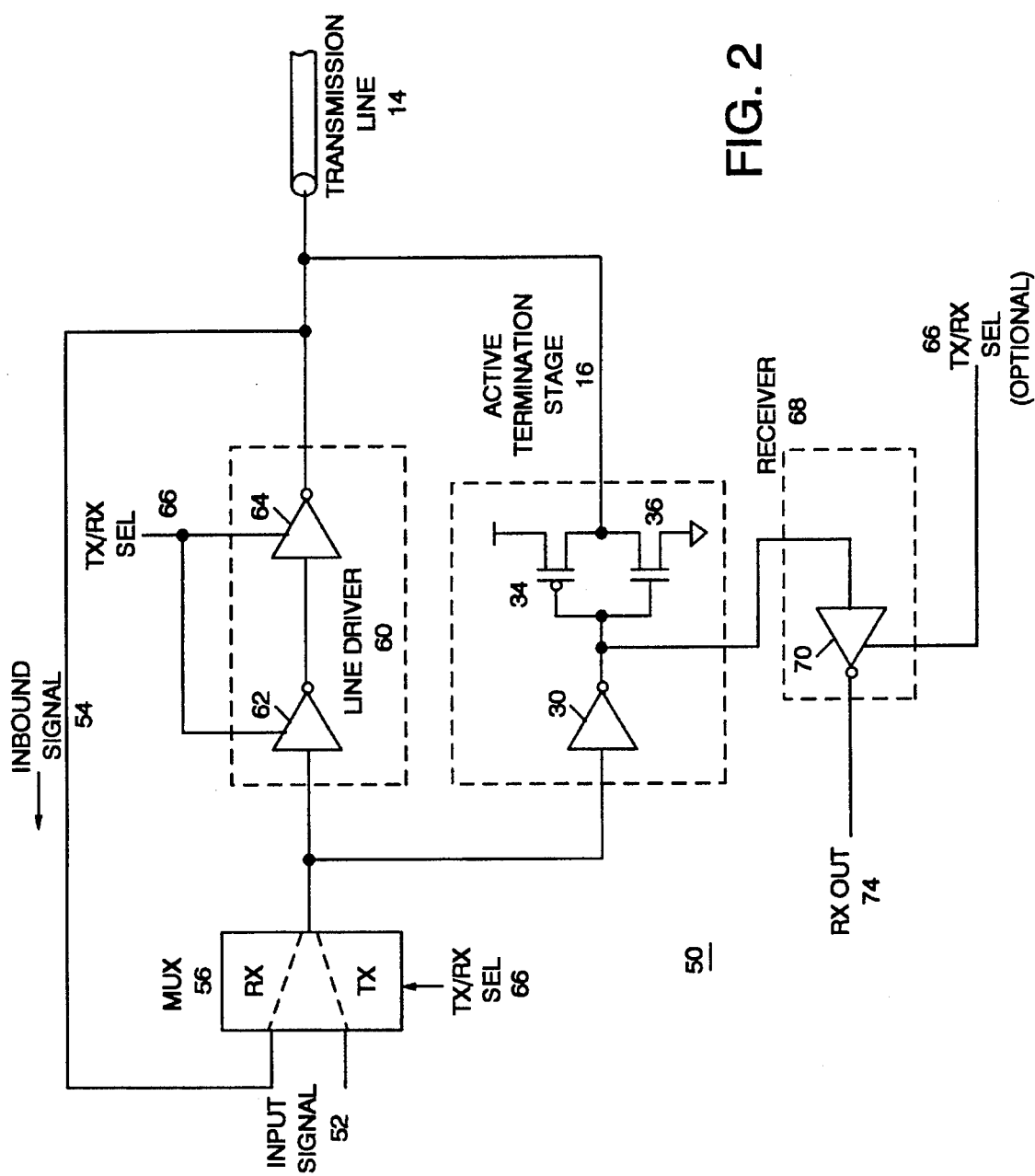
FIG. 2 illustrates an alternative line driver/receiver circuit in accordance with the present invention.

FIG. 2 illustrates an alternate line driver/receiver circuit 50 that includes a multiplexor 56, a line driver 60, the transmission line 14, the active termination stage 16, and a receiver 68. The line driver 60 includes a pair of tri-statable inverters 62 and 64 which are gated by a transmission/receive (Tx/Rx) select signal 66. The active termination stage 16 includes the inverter 30 and the complementary pair of transistors 34 and 36.

In operation, when the line driver/receiver circuit 50 is in the transmit mode, the Tx/Rx select signal 66 causes the multiplexor 56 to pass input signal 52 to the line driver 60. In addition, the Tx/Rx select signal 66 activates the line driver circuit 60 and may disable the receiver circuit 68. If the receiver circuit 68 is not disabled, it can be used to reflect back to the transmitting source the signal being supplied to the transmission line 14.

In the transmit mode, the active termination stage is coupled in parallel to the line driver circuit 60. With the parallel combination of the line driver circuit 60 and the active termination stage. 16, the line driver/receiver can source more current, i.e., drive a lower impedance load.

When the line driver circuit 50 is in the receive mode, the Tx/Rx select signal 66 tristates the line driver 60 and causes the multiplexor 56 to pass the inbound signal 54 to the active termination stage 16. In this configuration, inverter 30 couples to inverter 70 of the receiver to produce the receive output signal 74. In addition, the inverter 30 also provides an input to the complementary pair of transistors 34 and 36 which, as previously discussed, provide the active termination.

Figure 3:
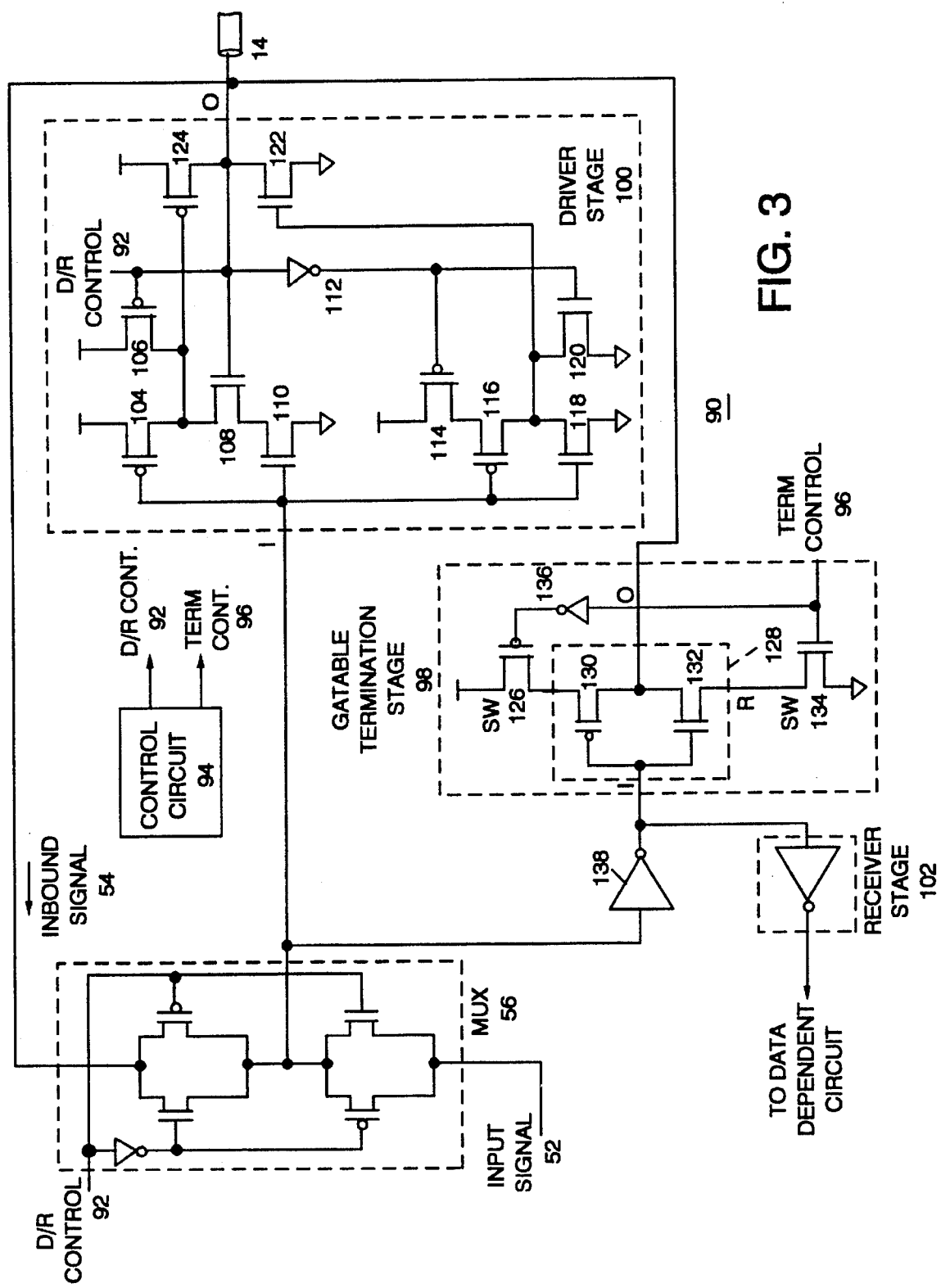
FIG. 3 illustrates yet another alternative line driver/receiver circuit in accordance with the present invention.

FIG. 3 illustrates yet another alternate line driver/receiver circuit 90. The line driver/receiver circuit 90 includes a multiplexor 56, a control circuit 94, a driver stage 100, a gatable termination stage 98, an inverter 138, and a receiver stage 102. The gatable termination stage 98 includes a pair of switches 126 and 134 and an inverter 128.

When the line driver/receiver circuit 90 is in the receive mode, the control circuit 94 produces the drive/receive control signal 92 as a logic zero. With the drive/receive control signal 92 in a logic zero state, the driver stage 100 is disabled because transistors 106 and 120 are active. With transistors 106 and 120 active, transistors 122 and 124 are held off thereby placing the output of the drive stage 100 in a high impedance, or tri-stated, condition. Note that the control circuit 94 may be associated with the line driver/receiver 90 and receive operational requests from a data dependent circuit. Alternatively, the control circuit 90 may be part of the data dependent circuit that supplies the control signals 92 and 96. A data dependent circuit may be part of ant integrated circuit and functions as a data processor, digital signal processor, microprocessor, microcontroller, or any other circuit that transmits and receives data via an external source.

Returning to the receive mode discussion, the control circuit 90 produces the termination control signal 96 as a logic one. Note that when the termination control signal is in the logic one state, it provides a logic one voltage to the gate of the switch 134 while it provides a logic zero state, via inverter 136, to switch 126. In this mode, switches 126 and 134 are activated, thus coupling the inverter 128 to the supply rails. With the inverter 128 active, transistors 130 and 132 provide the active termination for the transmission line 14. As previously mentioned, impedance of transistors 130 and 132 provide the active termination, thus, the on-resistance, or active impedance, of transistors 130 and 132 is chosen to be substantially equivalent to the impedance of the transmission line. For the purposes of this application, substantially equivalent to is within the range of plus or minus 10 percent.

Continuing with the receive mode discussion, multiplexor 56 provides the inbound signal 54 to inverter 138. Similar to the line driver/receiver circuits of FIG. 1 and FIG. 2, inverter 138 is used in connection with the inverter of the receiver stage 102 to provide a representation of the inbound signal to the data dependent circuit. In addition, the output of inverter 138 is used to drive the inverter 128 of the gatable termination stage 98. By utilizing inverter 138 for both the gatable termination stage and the receive stage, part count is reduced.

As mentioned, the gatable termination stage 98 provides an active termination of the transmission lines which may be switched in and out of the circuit, depending on the particular application of the circuit. With this circuit flexibility, the line driver/receiver 90 can be tested and/or burned-in without the active termination stage 98. Further, the line driver/receiver 90 can be coupled to a transmission line that is supporting a plurality of line driver/receivers without having to adjust the termination impedance each time a line driver/receiver was added to, or removed from, the circuit. The present invention enables the circuit to select one of the line driver/receivers to provide the termination impedance and disable the active termination stages in the other line driver/receivers.

When the line driver/receiver 90 is in the transmit mode, the gatable termination stage 98 may or may not be disabled. If the gatable termination stage is disabled, termination control signal 96 is a logic zero, thereby disabling switches 126 and 134. If, however, the termination control stage 96 is in a logic one state, switches 134 and 126 are enabled. With these switches enabled, the gatable termination stage is coupled in parallel with that of the driver stage 100. In addition, the drive/receive control signal 92 is in a logic one state. In the logic one state, the drive/receive control signal 92 provides a logic one to transistor 106, thereby keeping it off, and through inverter 112 provides a logic zero to transistor 120, thereby keeping it off. With these transistors off, transistors 108 and 114 are enabled. With transistor 108 active, transistors 104 and 110 act as an inverter stage which drives transistor 124. Similarly, with transistor 114 active, transistors 116 and 118 provide an inverting input to transistor 122. Further, multiplexor 56 provides an input signal 52 to the driver stage 100 and to inverter 138.

Figure 4:
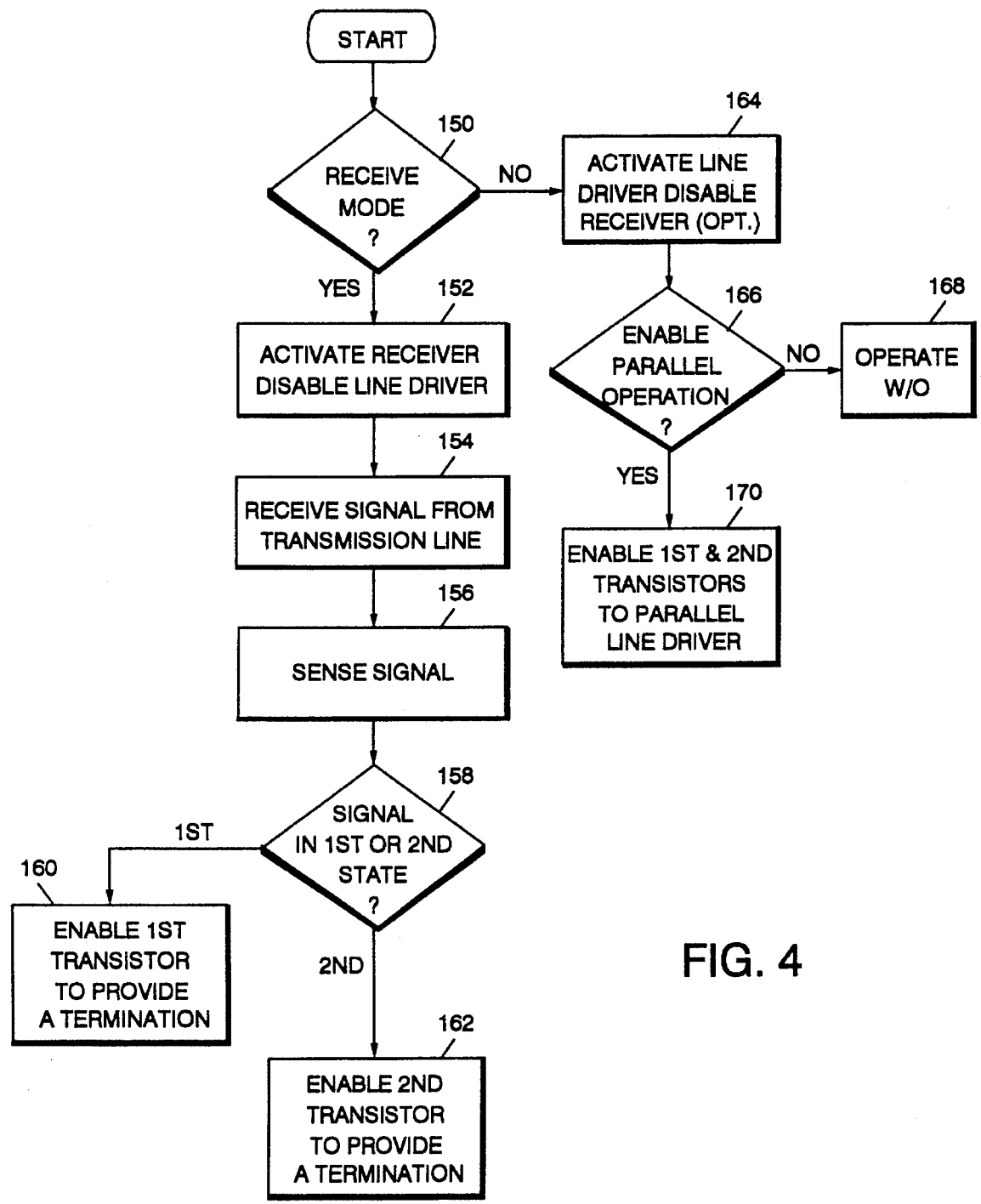
FIG. 4 illustrates a logic diagram that may be used to implement a line driver/receiver in accordance with the present invention.

FIG. 4 illustrates a logic diagram that may be used to implement the present invention. The process begins at step 150 where the line driver/receiver circuit determines whether it is in a receive mode or transmit mode. When the line driver/receiver is in the transmit mode, the process proceeds to step 164 where the line driver circuit is enabled. Additionally, as an option, the receiver may be disabled at step 164 as well. Having enabled the line driver, the line driver/receiver circuit determines, at step 166, whether parallel operations are needed. Parallel operations may be required when the line driver/receiver circuit has to provide a substantial amount of current to the transmission line. If such is the case, the line driver/receiver circuit enables first and second transistors to function in parallel with the line driver circuit. If, however, parallel operation is not needed, the line driver circuit operates without the assistance of the first and second transistors. This is shown at step 168.

If the line driver/receiver circuit is in the receive mode, the process proceeds to step 152 where the receiver is activated and the line driver is disabled. Next, the process proceeds to step 154 where a signal is received from the transmission line. While receiving this signal, the signal is sensed at step 156. Having sensed the signal, the process proceeds to step 158 where it is determined whether the signal is in a first or second state. When the signal is in a first state, which may be a logic high or a logic low, the process proceeds to step 160 where the first transistor is enabled to provide active termination for the transmission line. If, however, the signal is in the second state, the process proceeds to step 162 where the second transistor is enabled to provide the active termination. Note that the logic diagram of FIG. 4 may be implemented by any type of processing unit, such as a digital signal processor, a micro controller, a microprocessor, etc.

The present invention provides a method and apparatus for providing active transmission line termination. By utilizing a gatable termination stage, the present invention allows the line driver/receiver circuit to be tested without the termination stage; it also provides for the line driver/receiver circuit to be used in parallel with other line driver/receivers such that when the line driver/receiver circuit is not designated to a receive a circuit, it can tri-state the active impedance such that the circuit to receive the signal is providing the active termination. In addition, by utilizing the inverter of the active termination stage in conjunction with the receiver, part count is minimized. Further, the present invention allows the active termination stage to be parallelled with the line driver, when in the transmit mode, such that a higher current signal may be sourced on the transmission line.

I claim:

1. A line driver/receiver having active termination, the line driver/receiver comprising:

a line driver circuit operably coupled to receive an input signal and to supply a representation of the input signal to a transmission line when the line driver/receiver is in a transmit mode;

a receiver circuit operably coupled to receive an inbound signal from the transmission line when the line driver/receiver is in a receive mode;

active termination stage operably coupled to receive the inbound signal when the line driver/receiver is in the receive mode, the active termination stage includes:

an inverter operably coupled to receive the inbound signal and to provide an inverted representation of the inbound signal; and a pair of transistors interoperably coupled to receive the inverted representation of the inbound signal and to provide a recaptured inbound signal, wherein impedance of a transistor of the pair of transistors substantially matches impedance of the transmission line such that the transistor provides the active termination.

2. The line driver/receiver of claim 1, wherein the active termination stage further comprises being operably coupled in parallel with the line driver circuit when the line driver/receiver is in the transmit mode.

3. The line driver/receiver of claim 2 further comprises a multiplexor operably coupled to the line driver circuit and the active termination stage, wherein the multiplexor provides the input signal to the line driver circuit and the active termination stage when the line driver/receiver its in the transmit mode and provides the inbound signal to the active termination stage when the line driver/receiver is in the receive mode.

4. The line driver/receiver of claim 2, wherein the receiver circuit further comprises disable means for disabling the receiver when the line driver/receiver is in the transmit mode.

5. The line driver/receiver of claim 1, wherein the line driver circuit further comprises disable means for disabling the line driver circuit when the line driver/receiver is in the receive mode.

6. The line driver/receiver of claim 1, wherein a second transistor of the complementary pair of transistors further comprises an impedance that substantially matches the impedance of the transmission line when the second transistor is active.

7. A line driver/receiver comprising:

driver stage having a driver input and a driver output, the driver stage is operably coupled to source data to a transmission line;

receiver stage operably coupled to receive data from the transmission line;

gatable termination stage operably coupled to the transmission line, the gatable termination stage includes:

an inverter having an inverter input, an inverter output, a source node, and a return node, the inverter output is operably coupled to the driver output;

a first switch operably coupled to the source node;

a second switch operably coupled to the return node, wherein, when the first and second switches are inactive, the inverter is tri-stated;

an inverter stage having an inverter stage input and an inverter stage output, the inverter stage output is operably coupled to the inverter input; and multiplexor having a first input coupled to receive an inbound signal from the transmission line and a second input coupled to receive an input signal, an output of the multiplexor provides either the inbound signal or the input signal to the inverter stage input and the driver input as dictated by a control signal.

8. The line driver/receiver of claim 7, wherein the inverter further comprises:

a first transistor, wherein impedance of the first transistor, when the first transistor is active, substantially matches impedance of the transmission line; and a second transistor interoperably coupled to the first transistor to form the inverter, wherein impedance of the second transistor, when the second transistor is active, substantially matches the impedance of the transmission line.

9. The line driver/receiver of claim 7 further comprises a control circuit that provides a termination control signal that, when active, inactivates the first and second switches and provides a driver/receiver select signal to select either a transmit mode or a receive mode.

10. An integrated circuit comprising:

a die, wherein the die supports:

data dependent circuit; and a line driver/receiver that includes:

a line driver circuit operably coupled to receive outbound data from the data dependent circuit and to supply a representation of the outbound data to a transmission line when the line driver/receiver is in a transmit mode;

a receiver circuit operably coupled to receive inbound data from the transmission line and to provide a representation of the inbound data to the data dependent circuit when the line driver/receiver is in a receive mode;

active termination stage operably coupled to receive the inbound data when the line driver/receiver is in the receive mode, the active termination stage includes:

an inverter operably coupled to receive the inbound data and to provide an inverted representation of the inbound data; and a complementary pair of transistors interoperably coupled to receive the invertered representation of the inbound data and to provide recaptured inbound data wherein impedance of a transistor of the complementary pair of transistors substantially matches impedance of the transmission line, such that the transistor provides the active termination.

11. A method for providing an active line termination in a line driver/receiver, the method comprising the steps of:

a) when the line driver/receiver circuit is in a receive mode, activating a receiver circuit of the line driver/receiver and disabling a line driver circuit of the line driver/receiver;

b) receiving, by the receiver circuit, a signal from a transmission line;

c) sensing the signal;

d) when the signal is in a first state, enabling a first transistor to provide the active line termination; and e) when the signal is in a second state, enabling a second transistor to provide the active line termination.

12. The method of claim 11 further comprises the steps of:

when the line driver/receiver is in a transmit mode, activating the line driver circuit and disabling the receiver circuit; and when a parallel function is indicated, coupling the first and second transistors to provide a parallel line driver with the line driver circuit.

* * * * *

UNITED STATES PATENT AND TRADEMARK OFFICE
CERTIFICATE OF CORRECTION

PATENT NO. : 5,530,377

DATED : June 25, 1996

INVENTOR(S) : Lloyd A. Walls

It is certified that error appears in the above-indentified patent and that said Letters Patent is hereby corrected as shown below:

Column 6, line 11  Replace "its"
With --is--

Signed and Sealed this

First Day of July, 1997

Attest:

BRUCE LEHMAN

Attesting Officer  Commissioner of Patents and Trademarks